(12) United States Patent
Camilleri et al.

(10) Patent No.: US 8,946,960 B2
(45) Date of Patent: Feb. 3, 2015

(54) ELECTRIC MOTOR ASSEMBLY

(75) Inventors: Steven Camilleri, Darwin (AU);
Matthew Turner, Menzies Creek (AU)

(73) Assignee: Regal Beloit America, Inc., Beloit, WI (US)

( * ) Notice: Subject to any disclaimer, the term of this patent is extended or adjusted under 35 U.S.C. 154(b) by 364 days.

(21) Appl. No.: 13/509,166

(22) PCT Filed: Oct. 22, 2010

(86) PCT No.: PCT/AU2010/001404
§ 371 (c)(1),
(2), (4) Date: Aug. 20, 2012

(87) PCT Pub. No.: WO2011/057322
PCT Pub. Date: May 19, 2011

(65) Prior Publication Data
US 2013/0127275 A1 May 23, 2013
US 2014/0001902 A9 Jan. 2, 2014

(30) Foreign Application Priority Data

Nov. 13, 2009 (AU) ................................ 2009905588

(51) Int. Cl.
*H02K 7/06* (2006.01)
(52) U.S. Cl.
USPC ............................................ 310/90; 310/266
(58) Field of Classification Search
USPC .................... 310/90, 266, 267, 268
See application file for complete search history.

(56) References Cited

U.S. PATENT DOCUMENTS

| | | | | |
|---|---|---|---|---|
| 4,486,677 | A * | 12/1984 | Yamamoto et al. | 310/64 |
| 6,922,004 | B2 | 7/2005 | Hashimoto et al. | |
| 7,202,584 | B2 * | 4/2007 | Ida | 310/156.32 |
| 7,641,457 | B2 * | 1/2010 | Asai et al. | 418/171 |
| 2004/0061383 | A1 | 4/2004 | Tsuboi et al. | |
| 2005/0258696 | A1 | 11/2005 | Ida | |
| 2007/0210675 | A1 * | 9/2007 | Bender | 310/268 |

FOREIGN PATENT DOCUMENTS

| | | |
|---|---|---|
| CN | 1701486 A | 11/2005 |
| WO | WO 2008/134797 A1 | 11/2008 |

OTHER PUBLICATIONS

Chinese Office Action issued in Chinese Patent Application No. 201080051037.7 mailed Dec. 11, 2013.
Chinese Office Action issued in Chinese Patent Application No. 201080051037.7 mailed Aug. 15, 2014.

* cited by examiner

*Primary Examiner* — Hanh Nguyen
(74) *Attorney, Agent, or Firm* — Armstrong Teasdale LLP

(57) ABSTRACT

An axial flux electric motor is disclosed. The motor includes a rotor having a first rotor face, a second rotor face, a primary bearing locator on the first rotor face and one or more permanent magnets mounted to the first rotor face. Also included is a stator having a first stator face, a second stator face, a secondary bearing locator on the first stator face, a stator winding having one or more conductors and a connector for connection of the stator winding to a power source. A bearing assembly is also provided and positioned between the first face of the rotor and the first face of the stator for rotationally supporting movement of the rotor relative to the stator, the bearing assembly axially displacing the rotor from the stator to provide an air gap therebetween. The bearing assembly is engaged by the primary and secondary bearing locators to correctly position the bearing assembly.

26 Claims, 6 Drawing Sheets

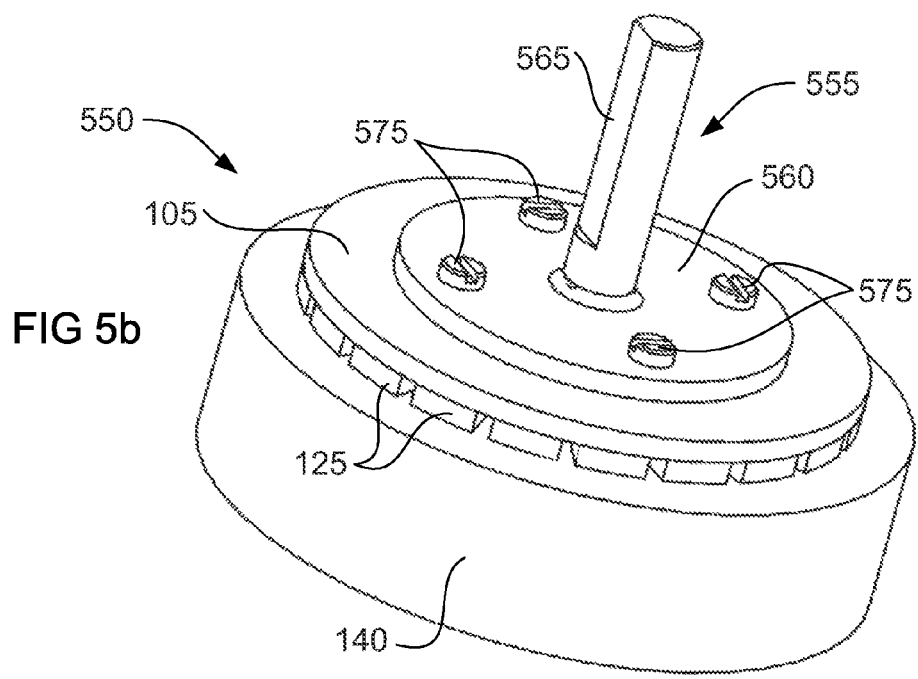
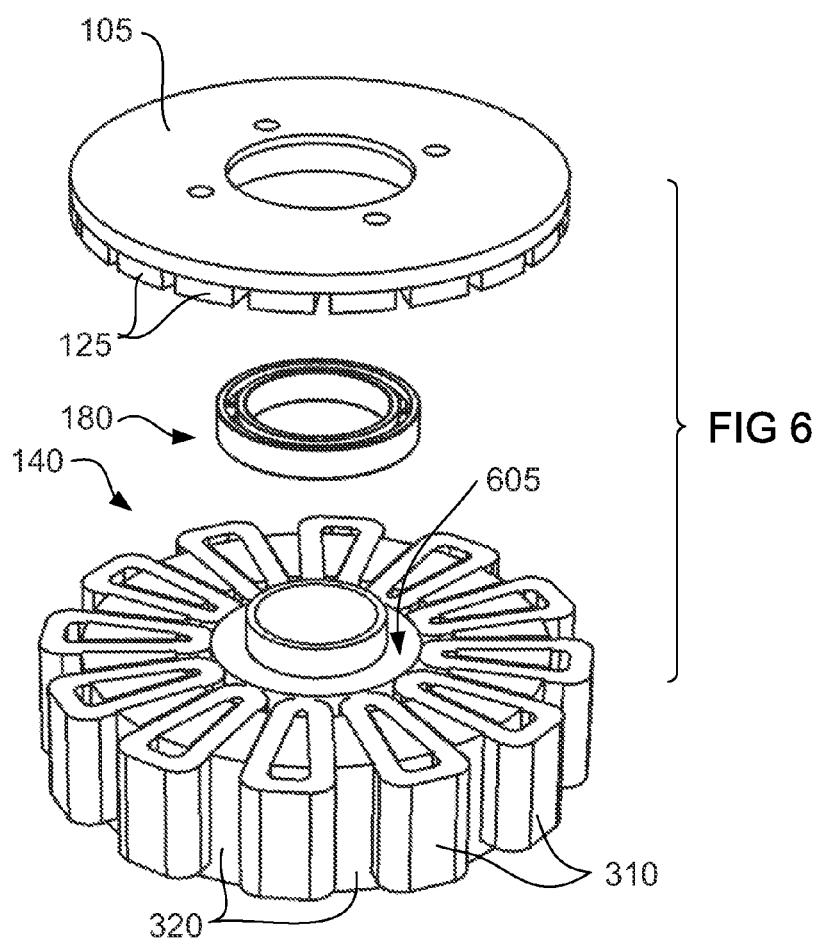

ELECTRIC MOTOR ASSEMBLY

CROSS REFERENCE TO RELATED APPLICATIONS

This application is a 35 U.S.C. §371 National Stage Application of PCT/AU2010/001404, filed Oct. 22, 2010, which claims priority to Australian Patent Application No. 2009905588, filed Nov. 13, 2009, the entire content of each application is incorporated herein by reference.

FIELD OF THE INVENTION

The present invention relates generally to electric motors, and in particular to an axial flux, brushless direct current (DC) motor.

BACKGROUND OF THE INVENTION

Brushless motors offer an advantage over conventional brushed motors since there is no need for the brushes to make mechanical contact with electrical contacts on the rotor. The common configuration for a brushless DC motors is radial-flux, which is composed from two cylinders, a cylindrical stator and a cylindrical rotor (having an axial shaft), with a cylindrical air gap in between and in which the flux travels across the air gap in a direction that is radial to the shaft on the rotor.

In order to hold the two cylinders concentric and thus keep the air gap constant thickness in a radial flux motor, it is necessary to support the shaft at each end of the motor.

Given that many applications which are mechanically powered by a brushless DC motor do not intrinsically require a shaft, it is desirable to eliminate the necessity for a shaft and thus provide a cheaper and simpler structure. This is difficult to do with a radial flux motor due to the requirement that the two cylinders are held concentric and thus keeping the air gap between the cylinders at a constant thickness.

It would be desirable to provide an axial flux electric motor that ameliorates or overcomes one or more disadvantages or inconveniences of existing motors.

Reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which the specification relates.

SUMMARY OF THE INVENTION

With this in mind, one aspect of the present invention provides an axial flux electric motor including: a rotor having a first rotor face, a second rotor face, a primary bearing locator on the first rotor face and one or more permanent magnets mounted to the first rotor face; a stator having a first stator face, a second stator face, a secondary bearing locator on the first stator face, a stator winding having one or more conductors and a connector for connection of the stator winding to a power source; a bearing assembly positioned between the first face of the rotor and the first face of the stator for rotationally supporting movement of the rotor relative to the stator, the bearing assembly axially displacing the rotor from the stator to provide an air gap therebetween; wherein the bearing assembly is engaged by the primary and secondary bearing locators to correctly position the bearing assembly.

Advantageously, the motor of the present invention may be constructed without a central shaft, resulting in a simplified motor and cost savings.

In a further advantage, the motor of the present invention is constructed with a single bearing assembly which is located in the plane of the air-gap between rotor and stator to allow the rotor to rotate and to provide an air gap for operation of the motor. Advantageously, locating the bearing in the plane of the air gap will generally minimise the size and shape of the entire motor structure.

Preferably, the bearing is a ball bearing assembly having a deep groove.

Advantageously, the magnetic force between stator and rotor also holds the motor together, without the need for a shaft or any dedicated clamping mechanisms.

Preferably, the bearing assembly is ring shaped having an outer ring and an inner ring; the primary bearing locator positioned on the rotor to engage the outer ring of the bearing assembly to correctly position the bearing assembly with respect to the rotor; and the secondary bearing locator positioned on the stator to engage the inner ring of the bearing assembly to correctly position the bearing assembly with respect to the stator.

Advantageously, this arrangement allows the motor to be easily assembled and ensures that the bearing assembly is correctly positioned and cannot be misaligned either during assembly or during operation of the motor.

It will be appreciated that the primary bearing locator positioned on the rotor may alternatively, engage the inner ring of the bearing assembly to correctly position the bearing assembly with respect to the rotor; and the secondary bearing locator positioned on the stator to alternatively engage the outer ring of the bearing assembly to correctly position the bearing assembly with respect to the stator.

Preferably, the primary and secondary bearing locator is a flange.

Alternatively, the primary and secondary bearing locator may be a raised lip that extends around a portion of the bearing assembly.

Advantageously, this saves on materials but still acts to locate the bearing assembly in the correct position during assembly and maintains the bearing assembly in the correct position during operation of the motor.

Alternatively, the primary and secondary bearing locator may include one or more flange segments.

In further alternative, the primary and secondary bearing locator may include one or more raised lips that extend around a portion of the bearing assembly to correctly position the bearing assembly.

In yet a further alternative, the primary and secondary bearing locator may include a recessed lip that extends around the bearing assembly.

Preferably, the rotor is an annular ring having an aperture therethrough, the rotor including an inner wall and outer wall.

Preferably, the stator is an annular ring having an aperture therethrough, the stator including an inner wall and outer wall.

Advantageously, the arrangement of the motor of the present invention provides an aperture down the entire axis of the motor (rotor, bearing assembly and stator). This aperture can then be used to store an integrated planetary gearbox, access for pipes, cables, flows of fluid or air. It may also be used to provide space for tall electronic components such as electrolytic capacitors which are required to operate the motor, thus reducing the total length of a motor with integrated electronic controller.

Advantageously, since the aperture extends down the entire axis of the motor, this results in a compact brushless DC motor (with integrated controller) which reduces the cost of the motor and provides advantages in the end application due to the reduced size.

Advantageously, the motor can still provide mechanical output power via the rotor without the need for a shaft. In an example, the outer wall of the rotor may further include a race for receiving a belt to be driven by the rotor.

In a further alternative, the inner wall of the rotor may include a ring gear for engaging a gearbox. In this case, the motor may be provided as an integrated gear-motor assembly.

In yet a further alternative, an application could also be directly attached to the outer face of the rotor. In the case of the application being a fan, one or more fan blades could be mounted directly on the rotor.

Alternatively, in the case where the application is a shaft drive, the rotor may include an attachment means for attaching a shaft to be driven by the rotor. The attachment means may be located on the inner wall of the rotor. Alternatively, the attachment means may be located on the upper face of the rotor. Preferably, the shaft is a stub shaft, mounted to a mounting plate. The mounting plate may be secured to the rotor face by way of attachment means in the form of welding, glue or one or more screws.

Preferably, the stator is made of a metal thereby providing a magnetic attraction between the one or more permanent magnets on the first rotor face and the stator to retain the rotor, bearing assembly and stator in place.

Preferably, the stator further includes a potting material which encases the stator and thus forms an enclosure for the stator portion of the motor.

Advantageously, a potted stator arrangement aids to protect the inner workings of the stator from the environment.

Preferably, the secondary bearing locator is located within the potting material.

Preferably, the secondary bearing locator is formed from the potting material.

The potting material may include polyester or polyurethane.

BRIEF DESCRIPTION OF THE DRAWINGS

FIG. 2a is an underside view of the rotor shown in FIG. 1a;

FIG. 3a is a top perspective view of the stator shown in FIG. 1a;

FIG. 4 is an exploded view of the axial flux electric motor shown in FIG. 1a;

FIG. 5b is perspective view of the axial flux electric motor shown in FIG. 1a with a stub attached to the rotor; and FIG. 6 is an exploded view of the axial flux electric motor according to a second embodiment.

Embodiments of the invention will now be described, by way of example only, with reference to the accompanying drawings. It is to be understood that the particularity of the drawings and embodiments does not supersede the generality of the preceding description of the invention.

DETAILED DESCRIPTION OF EMBODIMENTS OF THE INVENTION

Figure 1A:
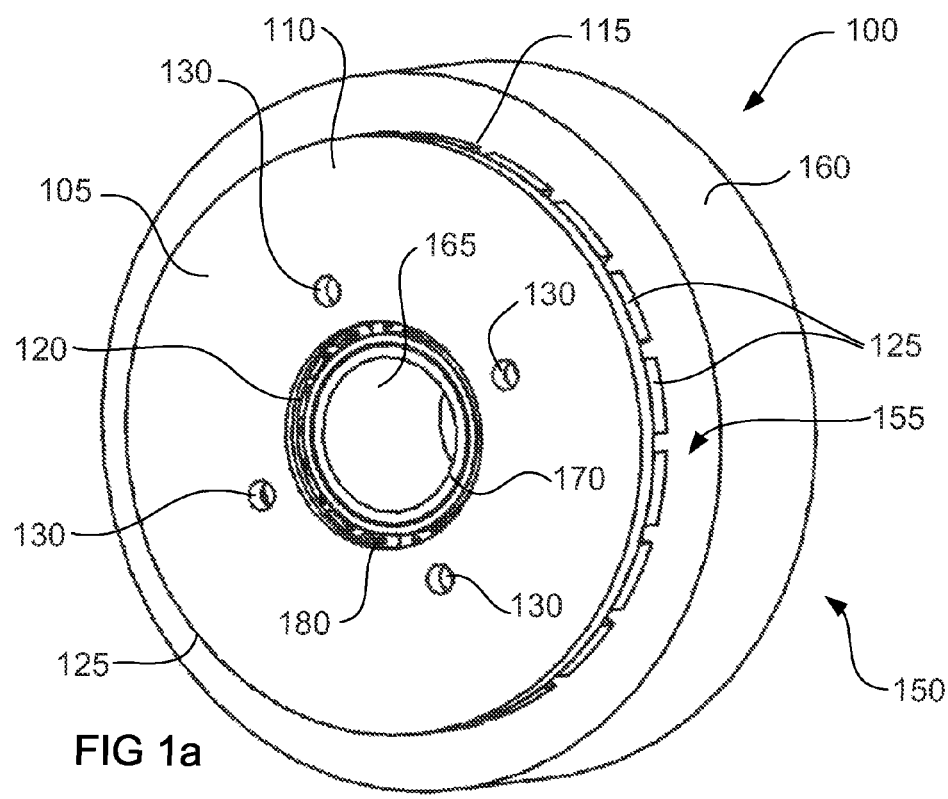
FIG. 1a is a perspective view of the axial flux electric motor according to the present invention.
Figure 1B:
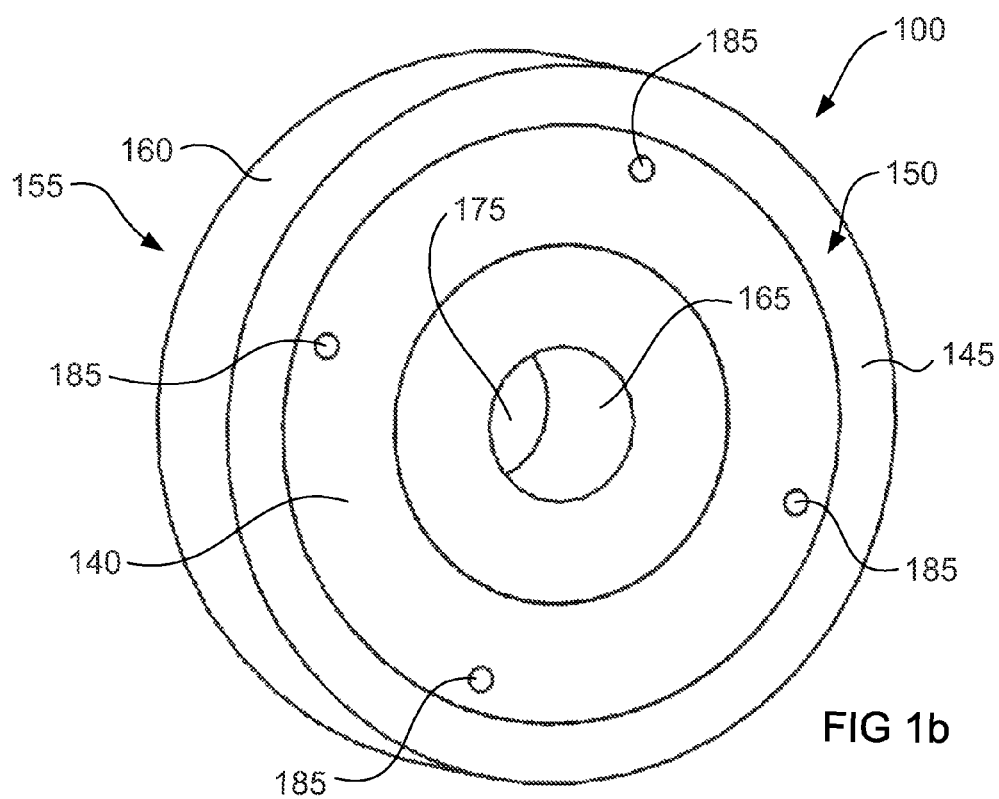
FIG. 1b is a perspective rear view of the axial flux electric motor according to the invention.

FIGS. 1a and 1b show a front perspective view and rear perspective view of an axial flux electric flux motor 100 according to the invention. The motor 100 includes a rotor 105, a stator 140 which is housed in a potting material 145 and a bearing assembly 180 which is disposed between the rotor 105 and the stator 140. The rotor 105 is an annular ring having an aperture 175 therethrough. The rotor 105 includes an upper face 110, a lower face 115 and inner wall 120 and an outer wall 125. Located on the lower face 115 is a plurality of magnets 125. The magnets 125 are preferably composed of Neodymium Iron Boron (NdFeB) material, however alternative materials such as Samarium Cobalt or Ferrite will also suffice. Also included on the rotor 105 are rotor mounting apertures 130 and a primary bearing locator 135 (more clearly shown in FIG. 2a). The stator 140 is retained within a potting material 145 which envelops the stator 140 so that the stator 140 is not damaged during operation of the motor 100. The stator 140 is surrounded by potting material 145 and includes a lower face 150 and upper face 155. The stator 140 is an annular ring having an aperture 175 therethrough and also includes an inner wall 165 and outer wall 160. The stator also includes a secondary bearing locator 170 which cooperates with the primary bearing locator 135 to retain the bearing assembly 180 in place. The bearing assembly 180 is secured between the secondary bearing locator 170 and the primary bearing locator 135. In operation, the rotor 105 rotates with respect to the stator 140. As shown in FIG. 1b, the stator 140 also includes stator mounting apertures 185 on the lower face 150 of the stator 140. The mounting apertures 185 are preferably threaded to allow the stator 140 to be mounted in a manner to hold the motor 100 in place using fasteners (such as screws).

Figure 2A:
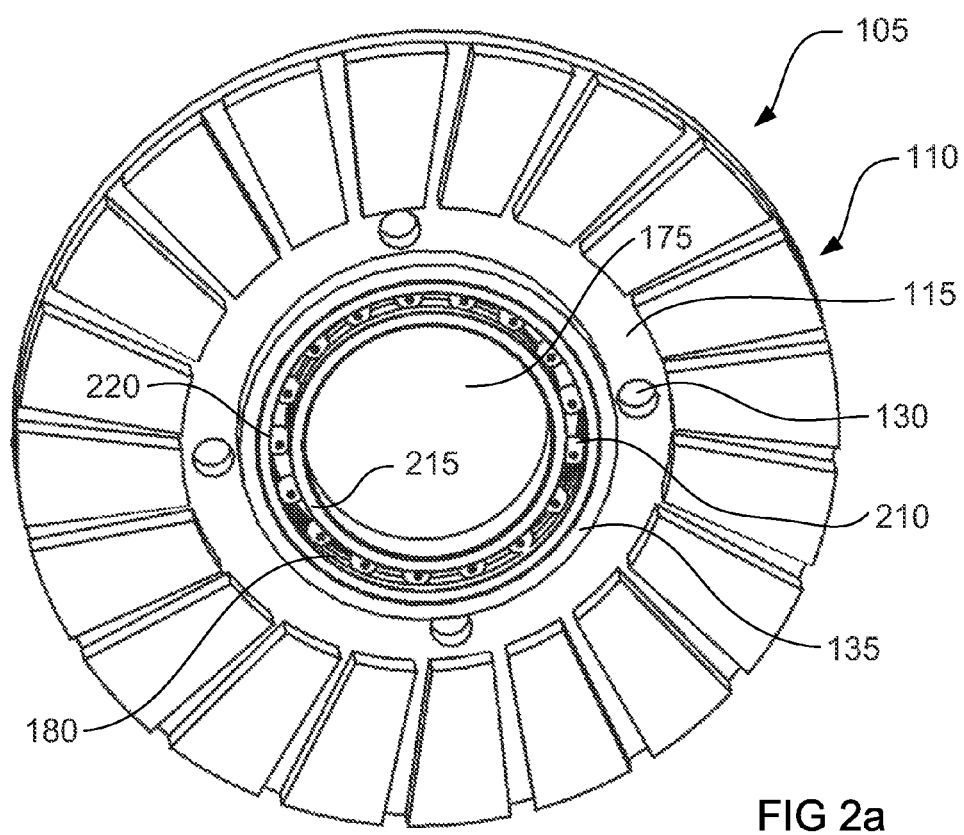

FIG. 2a illustrates an underside view of the rotor 105 of the axial flux electric motor 100 shown in FIG. 1A. The rotor 105 includes an upper face 110 and a lower face 115. Attached to the lower face 115 is a plurality of permanent magnets 125 spaced around the periphery of the lower face 115 of the rotor 105. The magnets 125 are preferably glued in place.

The rotor 105 also includes rotor mounting apertures 130. The mounting apertures 130 are preferably threaded to allow the rotor 105 to be mounted to a target application which needs to rotate (e.g. screwed to a set of fan blades, a drive shaft etc). Also shown is a primary bearing locator 135 and within the primary bearing locator is a bearing assembly 180. The bearing assembly 180 includes a race 205 and ball bearings 210 within the race 205. The bearing assembly 180 further includes an aperture 175 and an inner wall 215 and outer wall 220.

The primary bearing locator 135 in FIG. 2a is a flange which extends entirely around the outer wall 220 of the bearing assembly 180 so that the bearing assembly is correctly positioned. However, it will be appreciated that a plurality of flanges could be used, for example one or more flanges in the form of posts at a number of points around the outer wall 220 of the bearing assembly 180 would act to locate the bearing assembly 180 in the correct position. In an alternative embodiment, the bearing assembly 180 could sit in a recess formed as a primary bearing locator 135 such that a portion of the inner and outer walls 215, 220 of the bearing assembly 180 could be located in the recess. In a further alternative embodiment, the primary bearing locator 135 and secondary bearing locator 170 may each be formed from a material such as pressed metal, and securely attaching the "pressed metal" primary and secondary bearing locators in place to the stator 105 and rotor 140. Advantageously, this may allow for the precision of the bearing mounting diameter to be improved, but not add significantly to the overall production cost of the motor 100.

Figure 2B:
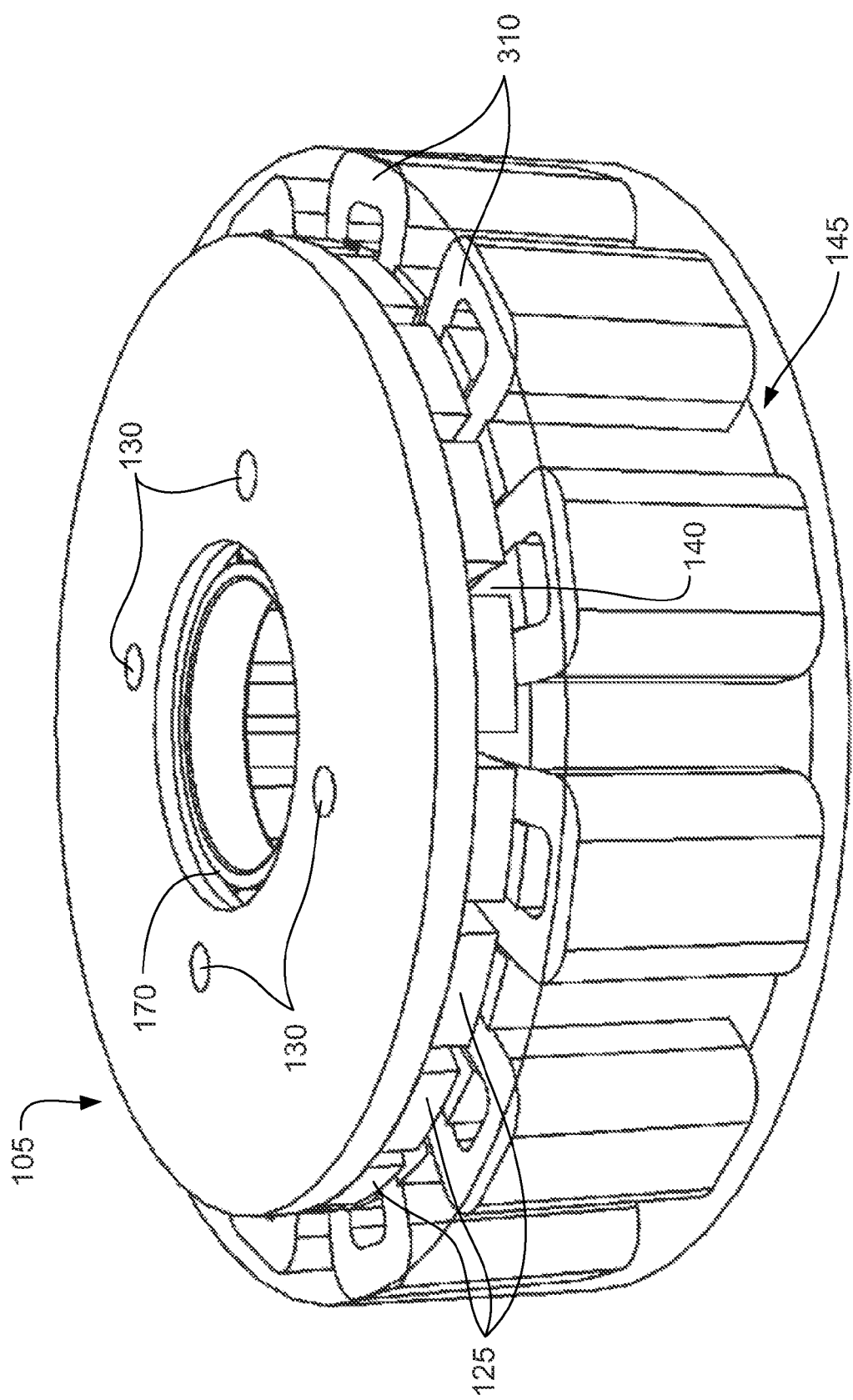
FIG. 2b is a perspective view of the axial flux electric motor with the potting material shown transparent and showing the stator and coils.

FIG. 2b illustrates the axial flux electric motor 100 of FIG. 1a, but with the potting material 145 shown transparent so that the stator 140 is visible. The stator 140 includes one or more coils 310 for generating flux when the magnets 125 on the rotor 105 are rotated with respect to the stator 140. In operation, an electronic controller (not shown) is provided as a three phase inverter which switches power to the three motor phases in such a manner as to generate a rotating magnetic field which the rotor 105 synchronises to. The electronic controller controls the speed and intensity of the applied voltage in order to maintain this synchronisation at the best level of efficiency. Further operation of the motor will not be described since it will be apparent to those skilled in the art.

Figure 3A:
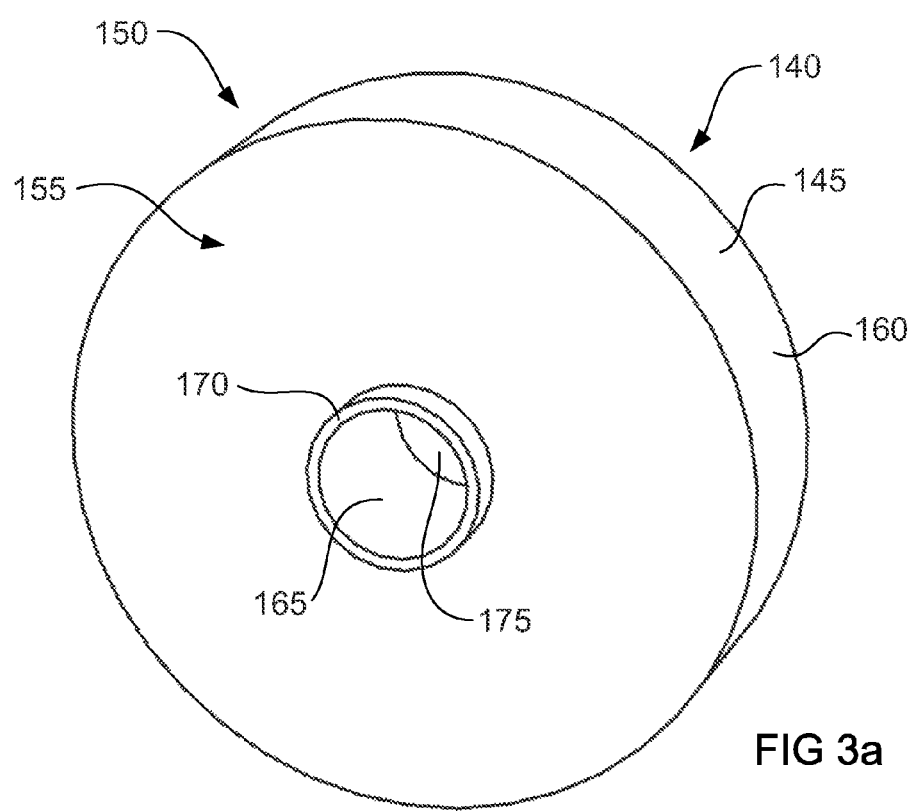

FIG. 3a illustrates a top perspective view of the stator 140 having the potting material 145 encasing the stator 140. The stator 140 is circular and has an aperture 175. The stator 140 includes an outer wall 160, an inner wall 165 and an upper face 155 and lower face 150. Extending from the upper face 155 is a secondary bearing locator 170 which in FIG. 3a is in the form of a flange which extends around the outer wall 220 of the bearing assembly 180. Preferably, the secondary bearing locator 170 abuts the inner wall 215 of the bearing assembly 180 (this will be described further with reference to FIG. 4).

Figure 3B:
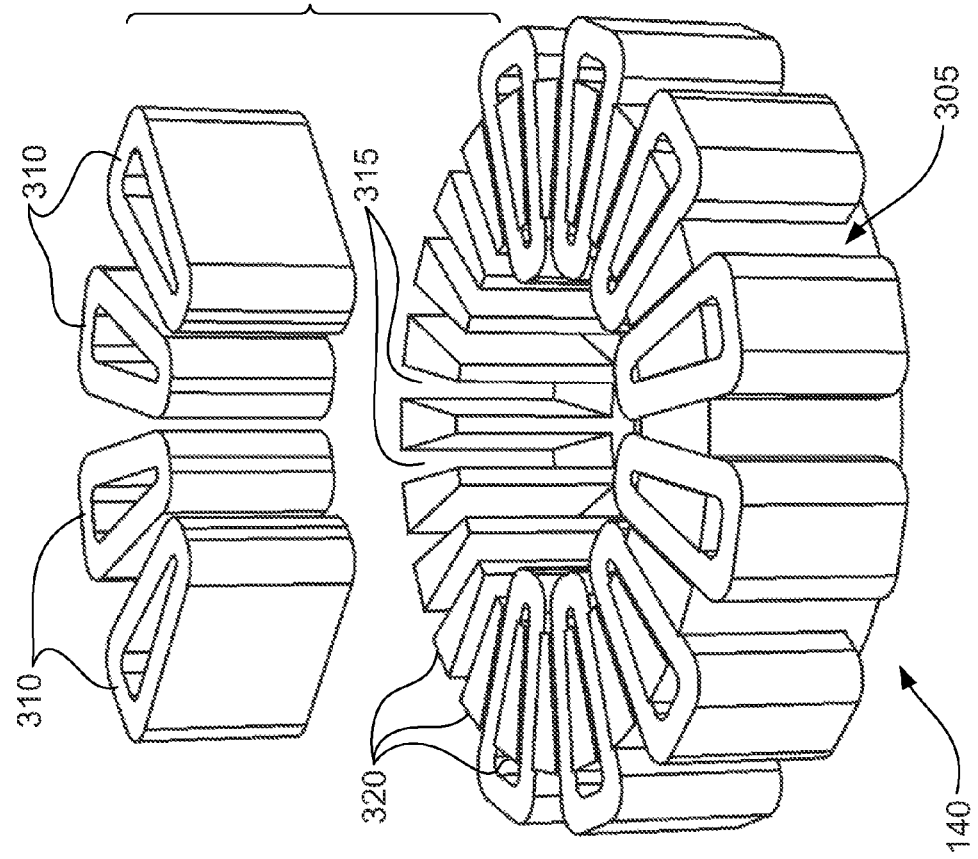
FIG. 3b is an exploded view of the stator showing the coils and strip wound core.

FIG. 3b illustrates a partial exploded view of the stator 140 without the potting material 145. The stator 140 includes a strip wound core 305 which is manufactured from a long steel ribbon wound into a toroidal shape. A number of slots 315 are punched into the ribbon by a punch and wind machine (not shown) to form slots 315 and posts 320. Copper coils 310 are then wound around the posts 320. The stator 140 once assembled may be put into an injection moulding insertion die where it is overmoulded with a potting material such as that shown in FIG. 3a. An example of the suitable plastic would be DuPont™ Rynite™, Zenite™ or Zytel™. Preferably the potting material 145 also includes a secondary bearing locator 170 which is formed from the potting material. Alternatively, as will be shown in FIG. 6 the potting material 145 may be omitted and the secondary bearing locator 170 may be attached to the upper face 155 of the stator 140 for engagement with the bearing assembly 180.

Figure 4:
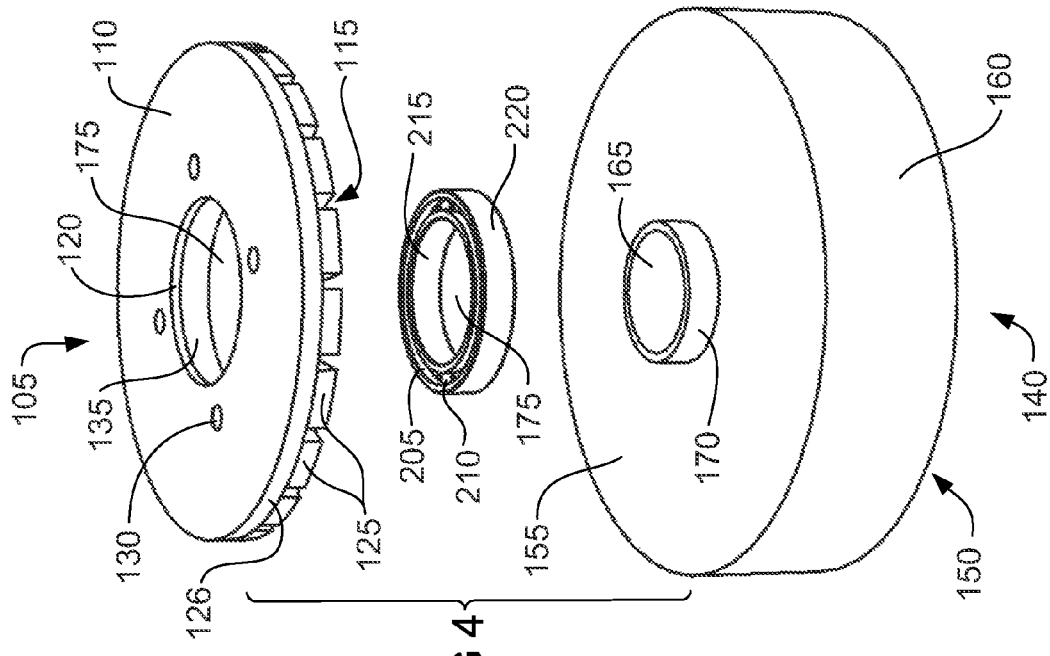

FIG. 4 shows an exploded view of FIG. 1 better illustrating the assembly of the rotor 105, the bearing assembly 180 and the stator 140. The rotor 105 includes an outer wall 126 and an inner wall 120. Extending from the inner wall 120 is the primary bearing locator 135 which acts to directly position the bearing assembly 180. The primary bearing locator may be formed as part of the inner wall of the stator or may be separate. The bearing assembly 180 includes a race 205 and ball bearings 210 within the race 205. The bearing assembly 180 further includes an aperture 175 and an inner wall 215 and outer wall 220. The primary bearing locator 135 of the rotor 105 engages and locates the bearing assembly 180 by engaging the outer wall 220 of the bearing assembly 180. In turn, the stator 140 includes an upper face 155 through which extends a secondary bearing locator 170 such that it engages the inner wall 215 of the bearing assembly 180 to further position the bearing assembly 180 and to ensure a good connection between the stator 140, bearing assembly 180 and rotor 105. It should be noted that the magnetic force between the magnets 125 on the rotor 105 and the stator 140 acts to keep the motor 100 in one piece. Further, the bearing assembly 180 as well as acting to provide an air gap between the rotor 105 and the stator 140 also acts to allow rotation of the rotor 105 relative to the stator 140. Advantageously, only one bearing assembly 180 needs to be used. In a further advantage, the aperture 175 extends from the rotor 105 through bearing assembly 180 and through stator 140. Advantageously, the axial flux motor does not require a shaft as an integral part of the motor structure. As shown, the present invention provides a single bearing assembly 180 located in the plane of the air gap to hold the motor 100 together without the need for a shaft. This results in a simpler, cheaper, more reliable axial flux motor.

Figure 5A:
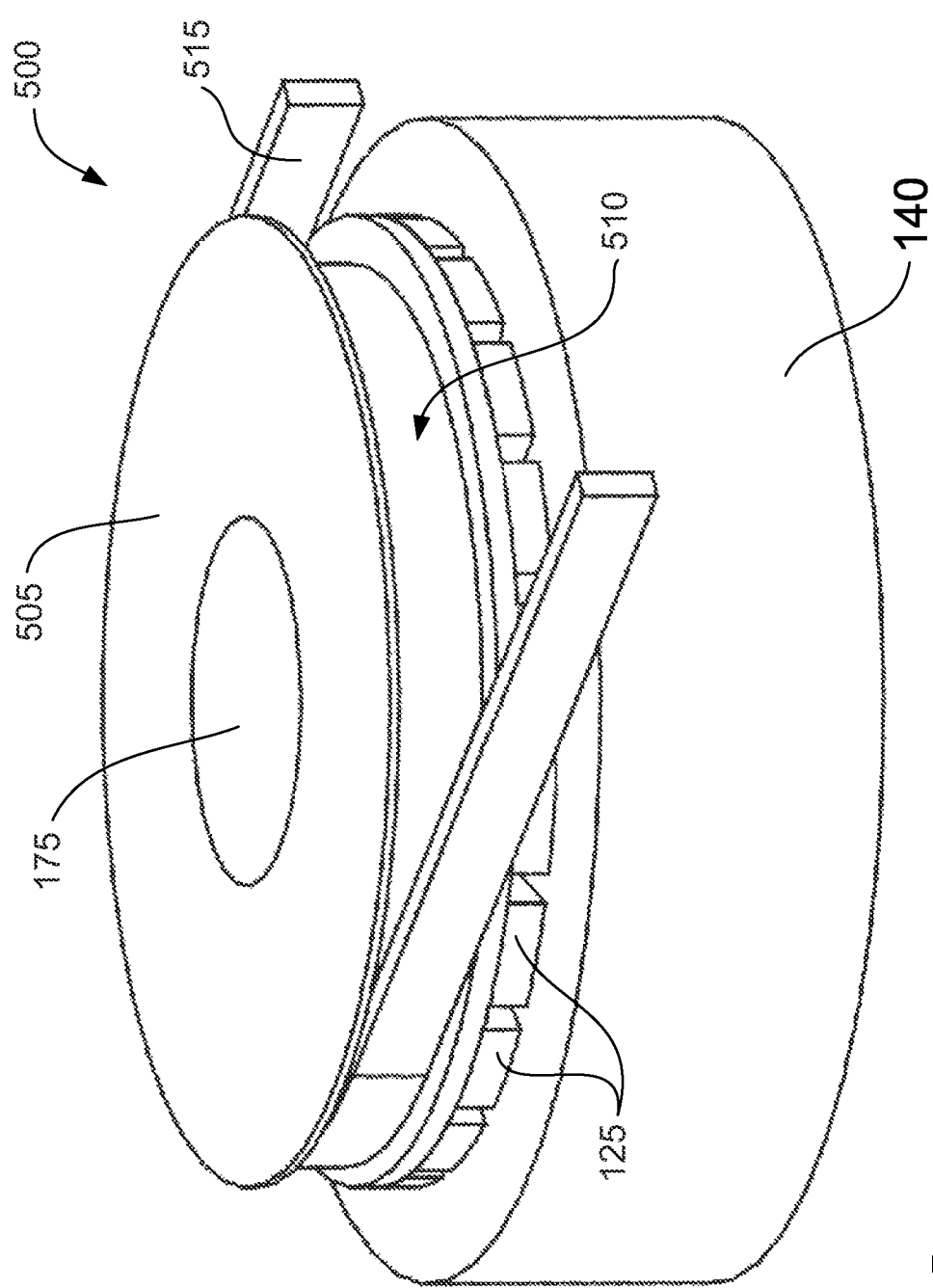
FIG. 5a is perspective view of the axial flux electric motor shown in FIG. 1a with a stator arranged to drive a belt.

Many applications for the axial flux motor do not require a shaft or power transmission. As alternate motor 500 is shown in FIG. 5a and includes a rotor 505 which includes a race 510 for receiving a belt 515. Advantageously, each of the rotor 505, bearing (not shown) and stator 145 is an annular ring having an aperture 175 therethrough which still allows electronic components such as electrolytic capacitors which are required to operate the motor.

Another alternative motor 550 is shown in FIG. 5b, where a shaft assembly 555 may be face mounted to the rotor 105 if required. The shaft assembly 555 includes a mounting plate 560 and a shaft 565. The mounting plate 560 further includes apertures 570 for receiving attachment means in the form of screws 575 for securing the shaft arrangement 555 to the rotor 105. The attachment means 575 also extend through the rotor mounting apertures 130 (not shown) on the rotor 105 to secure the shaft arrangement to the rotor 105. In an alternative, the attachment means may be via a weld between the mounting plate 560 and the rotor 105. In a further alternative, the attachment means may include glue applied between the mounting plate 560 and the rotor 105 to secure the shaft assembly in place.

Even if a shaft is required to be face mounted to the rotor 105, the system of the present invention is still advantageous since the motor 100 with a removable shaft would be of less weight that a similar axial flux motor with an integral shaft. Further, only one bearing assembly 180 needs to be used.

FIG. 6 shows an exploded view of the axial flux motor shown in FIG. 4 except without potting material 140. In an alternative to the potted stator 140, a secondary bearing locator 605 made of machined metal could be attached to the stator 140 with the potting material being omitted. Advantageously, secondary bearing locator 605 made of machined metal would still be cheaper than existing systems and still incorporate the key characteristics of the present invention, namely axial flux, no requirement for an internal shaft and a single bearing located in the plane of the air gap.

Optional embodiments of the present invention may also be said to broadly consist in the paths, elements and features referred to or indicated herein, individually or collectively, in any or all combinations of two or more of the paths, elements or features and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

What is claimed is:

1. An axial flux electric motor comprising:
 a rotor having a first rotor face, a second rotor face, a primary bearing locator on the first rotor face, and one or more permanent magnets mounted to the first rotor face;
 a stator having a first stator face, a second stator face, and a secondary bearing locator on the first stator face;
 a potting material at least partially encasing the stator, wherein the secondary bearing locator is at least one of located within the potting material and formed from the potting material; and
 a bearing assembly positioned between the first rotor face and the first stator face for rotationally supporting movement of the rotor relative to the stator, the bearing assembly axially displacing the rotor from the stator to provide an air gap therebetween;
 wherein the bearing assembly is engaged by the primary and secondary bearing locators to correctly position the bearing assembly.

2. The axial flux electric motor of claim 1, wherein the bearing assembly is ring shaped having an outer ring and an inner ring; the primary bearing locator positioned on the rotor to engage the outer ring of the bearing assembly to correctly position the bearing assembly with respect to the rotor; and the secondary bearing locator positioned on the stator to engage the inner ring of the bearing assembly to correctly position the bearing assembly with respect to the stator.

3. The axial flux electric motor of claim 1, wherein at least one of the primary bearing locator and the secondary bearing locator comprises a flange.

4. The axial flux electric motor of claim 1, wherein at least one of the primary bearing locator and the secondary bearing locator comprises a substantially circular flange that extends around at least a portion of the bearing assembly.

5. The axial flux electric motor of claim 1, wherein at least one of the primary bearing locator and the secondary bearing locator includes one or more flange segments.

6. The axial flux electric motor of claim 1, wherein the rotor is an annular ring having an aperture therethrough, the rotor including an inner wall and an outer wall.

7. The axial flux electric motor of claim 6, wherein the outer wall of the rotor further includes a race for receiving a belt to be driven by the rotor.

8. The axial flux electric motor of claim 6, further including one or more applications removably attached to the second rotor face.

9. The axial flux electric motor of claim 8, wherein the application includes any one of a fan or a shaft drive.

10. The axial flux electric motor of claim 6, wherein the rotor further includes an attachment means for attaching a shaft to be driven by the rotor.

11. The axial flux electric motor of claim 10, wherein the attachment means is located on at least one of the inner wall and the upper face of the rotor.

12. The axial flux electric motor of claim 10, wherein the shaft is a stub shaft, mounted to a mounting plate, the mounting plate secured to the rotor by way of the attachment means.

13. The axial flux electric motor of claim 1, wherein the stator is an annular ring having an aperture therethrough, the stator including an inner wall and an outer wall.

14. The axial flux electric motor of claim 1, wherein the stator comprises a metal that provides a magnetic attraction between the one or more permanent magnets on the first rotor face and the stator to retain the rotor, bearing assembly and stator in place.

15. The axial flux electric motor of claim 1, wherein the potting material comprises at least one of polyester and polyurethane.

16. An axial flux electric motor comprising:
 a rotor comprising a first rotor face and a second rotor face, the rotor further comprising an opening defined therein extending from the first rotor face to the second rotor face;
 a stator comprising a first stator face and a second stator face, the stator further comprising an opening defined there extending from the first stator face to the second stator face; and
 a bearing assembly positioned between the first rotor face and the first stator face for supporting rotation of the rotor relative to the stator, the bearing assembly comprising an opening defined therein, and wherein the rotor opening, the stator opening, and the bearing assembly opening align to form an aperture extending through the motor along an axis of rotation of the motor to enable at least one motor component to extend into the aperture.

17. The motor according to claim 16, wherein the rotor further comprises a primary bearing locator at least one of defined within the first rotor face and extending from the first rotor face.

18. The motor according to claim 17, wherein the bearing assembly is engaged by the primary bearing locator to correctly position the bearing assembly with respect to the rotor.

19. The motor according to claim 16, wherein the stator further comprises a secondary bearing locator at least one of defined within the first stator face and extending from the first stator face.

20. The motor according to claim 19, wherein the bearing assembly is engaged by the secondary bearing locator to correctly position the bearing assembly with respect to the stator.

21. The motor according to claim 16, wherein the bearing assembly axially displaces the rotor from the stator to provide an air gap therebetween.

22. The motor according to claim 16, wherein the rotor comprises an outer wall and an inner wall, and wherein the rotor further comprises at least one of:
 a race positioned on the outer wall and configured to receive a belt to be driven by the rotor; and
 a gear positioned on the inner wall and configured to engage a corresponding gear.

23. The motor according to claim 16, wherein the rotor further comprises at least one mounting aperture defined therein and configured for coupling with a target application.

24. The motor according to claim 23, wherein the target application comprises at least one of a set of fan blades and a drive shaft.

25. The motor according to claim 16, wherein the stator further comprises at least one mounting aperture defined therein and configured for coupling the motor to a fixed surface.

26. The motor according to claim 16, wherein the motor component extending into the aperture comprises at least one of a capacitor, a gearbox, a pipe, and a cable.

* * * * *